United States Patent
Chavez et al.

(10) Patent No.: US 11,820,017 B1
(45) Date of Patent: Nov. 21, 2023

(54) METHODS FOR TRACKING AND REPLACEMENT OF A SANDING PAD

(71) Applicant: GrayMatter Robotics Inc., Los Angeles, CA (US)

(72) Inventors: Miguel Chavez, Los Angeles, CA (US); Satyandra K. Gupta, Los Angeles, CA (US); Ariyan M. Kabir, Los Angeles, CA (US); Vihan Krishnan, Los Angeles, CA (US); Ashish Kulkarni, Los Angeles, CA (US); Ceasar Navarro, Los Angeles, CA (US); Husein Noble, Los Angeles, CA (US); Brual C. Shah, Los Angeles, CA (US); Jeano Vincent, Los Angeles, CA (US)

(73) Assignee: GrayMatter Robotics Inc., Los Angeles, CA (US)

( * ) Notice: Subject to any disclaimer, the term of this patent is extended or adjusted under 35 U.S.C. 154(b) by 0 days.

(21) Appl. No.: 18/136,241

(22) Filed: Apr. 18, 2023

Related U.S. Application Data

(63) Continuation-in-part of application No. 18/111,470, filed on Feb. 17, 2023, which is a continuation of
(Continued)

(51) Int. Cl.
*B24B 51/00* (2006.01)
*B25J 13/08* (2006.01)
(Continued)

(52) U.S. Cl.
CPC ............ *B25J 9/1653* (2013.01); *B24B 51/00* (2013.01); *B25J 9/163* (2013.01); *B25J 9/1664* (2013.01);
(Continued)

(58) Field of Classification Search
CPC ........ B25J 9/1653; B25J 9/163; B25J 9/1664; B25J 9/1679; B25J 9/1697; B25J 11/0065;
(Continued)

(56) References Cited

U.S. PATENT DOCUMENTS

| | | | |
|---|---|---|---|
| 2018/0283019 A1* | 10/2018 | Telleria ................... | B24B 55/06 |
| 2019/0240802 A1* | 8/2019 | Hariharan ........... | H01L 21/3212 |
| 2021/0349132 A1* | 11/2021 | Ikeda .................. | G01R 31/343 |

* cited by examiner

Primary Examiner — Robert T Nguyen
(74) Attorney, Agent, or Firm — Run8 Patent Group, LLC; Peter Miller

(57) ABSTRACT

A method includes: accessing a toolpath and processing parameters—including a target force and feed rate—assigned to a region of a workpiece; and accessing a wear model representing abrasive degradation of a sanding pad arranged on a sanding head. The method also includes, during a processing cycle: accessing force values output by a force sensor coupled to the sanding head; navigating the sanding head across the workpiece region according to the toolpath and, based on the force values deviating the sanding head from the toolpath to maintain forces of the sanding head on the workpiece region proximal the target force; accessing contact characteristics representing contact between the sanding pad and the workpiece; estimating abrasive degradation of the sanding pad based on the wear model and the sequence of contact characteristics; and modifying the set of processing parameters based on the abrasive degradation.

20 Claims, 4 Drawing Sheets

Related U.S. Application Data application No. 17/829,193, filed on May 31, 2022, now Pat. No. 11,613,014, which is a continuation of application No. 17/826,840, filed on May 27, 2022, which is a continuation-in-part of application No. 17/390,885, filed on Jul. 31, 2021.

(60) Provisional application No. 63/431,634, filed on Dec. 9, 2022, provisional application No. 63/059,932, filed on Jul. 31, 2020.

(51) Int. Cl.
*B25J 9/16* (2006.01)
*B25J 11/00* (2006.01)
*G06T 7/13* (2017.01)
*G06T 1/00* (2006.01)
*G06T 7/60* (2017.01)
*G06T 19/00* (2011.01)

(52) U.S. Cl.
CPC ........... *B25J 9/1679* (2013.01); *B25J 9/1697* (2013.01); *B25J 11/0065* (2013.01); *B25J 13/085* (2013.01); *G06T 1/0014* (2013.01); *G06T 7/13* (2017.01); *G06T 7/60* (2013.01); *G06T 19/00* (2013.01); *G06T 2207/10024* (2013.01); *G06T 2219/004* (2013.01)

(58) Field of Classification Search
CPC ...... B25J 13/085; B24B 51/00; G06T 1/0014; G06T 7/13; G06T 7/60; G06T 19/00; G06T 2207/10024; G06T 2219/004
See application file for complete search history.

US 11,820,017 B1

METHODS FOR TRACKING AND REPLACEMENT OF A SANDING PAD

CROSS-REFERENCE TO RELATED APPLICATIONS

This application claims the benefit of U.S. Provisional Application No. 63/431,634, filed on 9 Dec. 2022, which is incorporated in its entirety by this reference.

This Application is a continuation-in-part of U.S. application Ser. No. 18/111,470, filed on 17 Feb. 2023, which is a continuation of U.S. application Ser. No. 17/829,193, filed on 31 May 2022, which is a continuation of U.S. application Ser. No. 17/826,840, filed on 27 May 2022, which is a continuation-in-part of U.S. application Ser. No. 17/390,885, filed on 31 Jul. 2021, which claims the benefit of U.S. Provisional Application No. 63/059,932, filed on 31 Jul. 2020, each of which is incorporated in its entirety by this reference.

TECHNICAL FIELD

This invention relates generally to the field of automated finishing and more specifically to a new and useful method for automated wear tracking and replacement triggering of a sanding pad in the field of automated finishing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method: Sanding Pad Replacement

Figure 1:
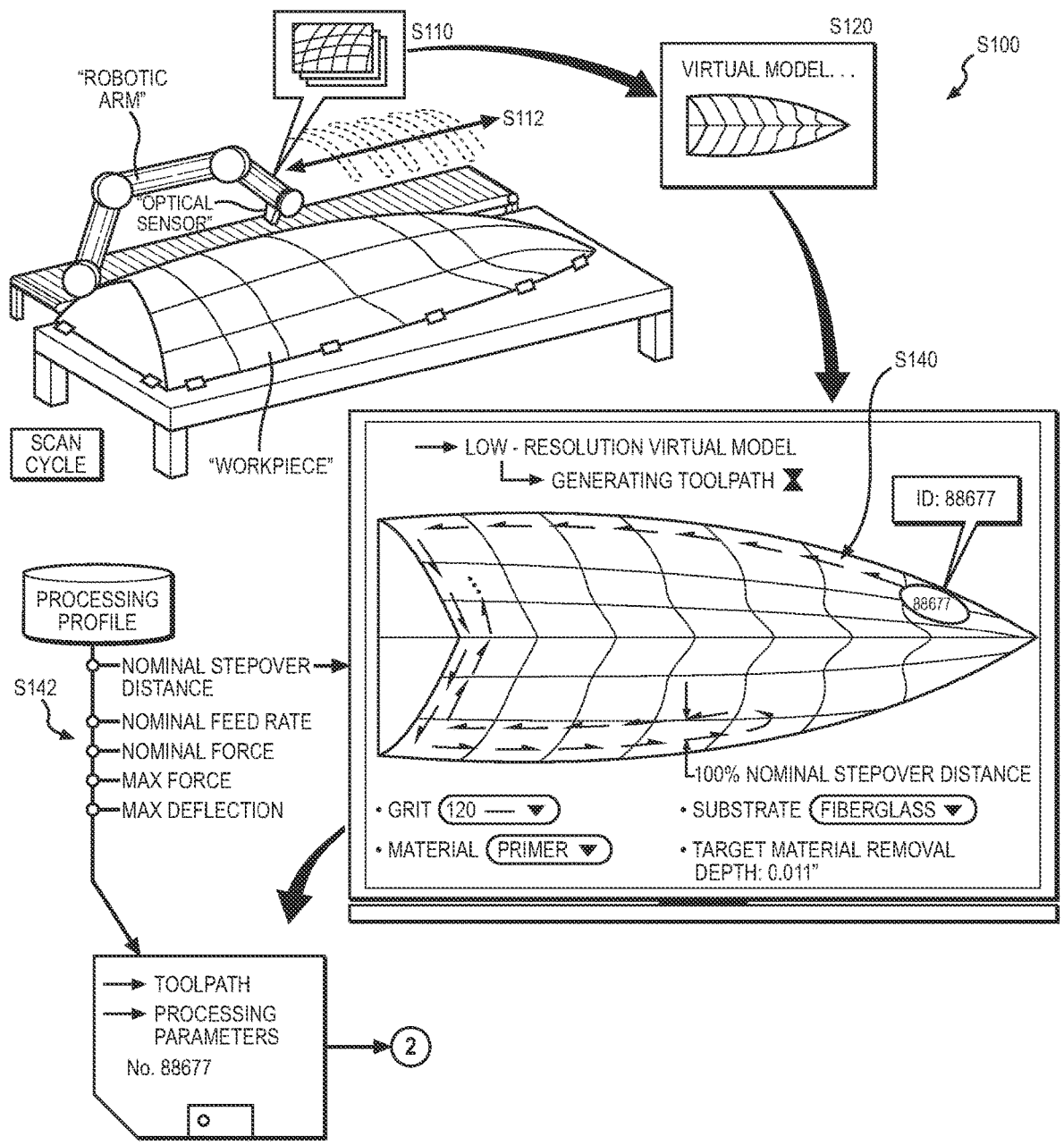
FIG. 1 is a flowchart representation of a method.
Figure 2:
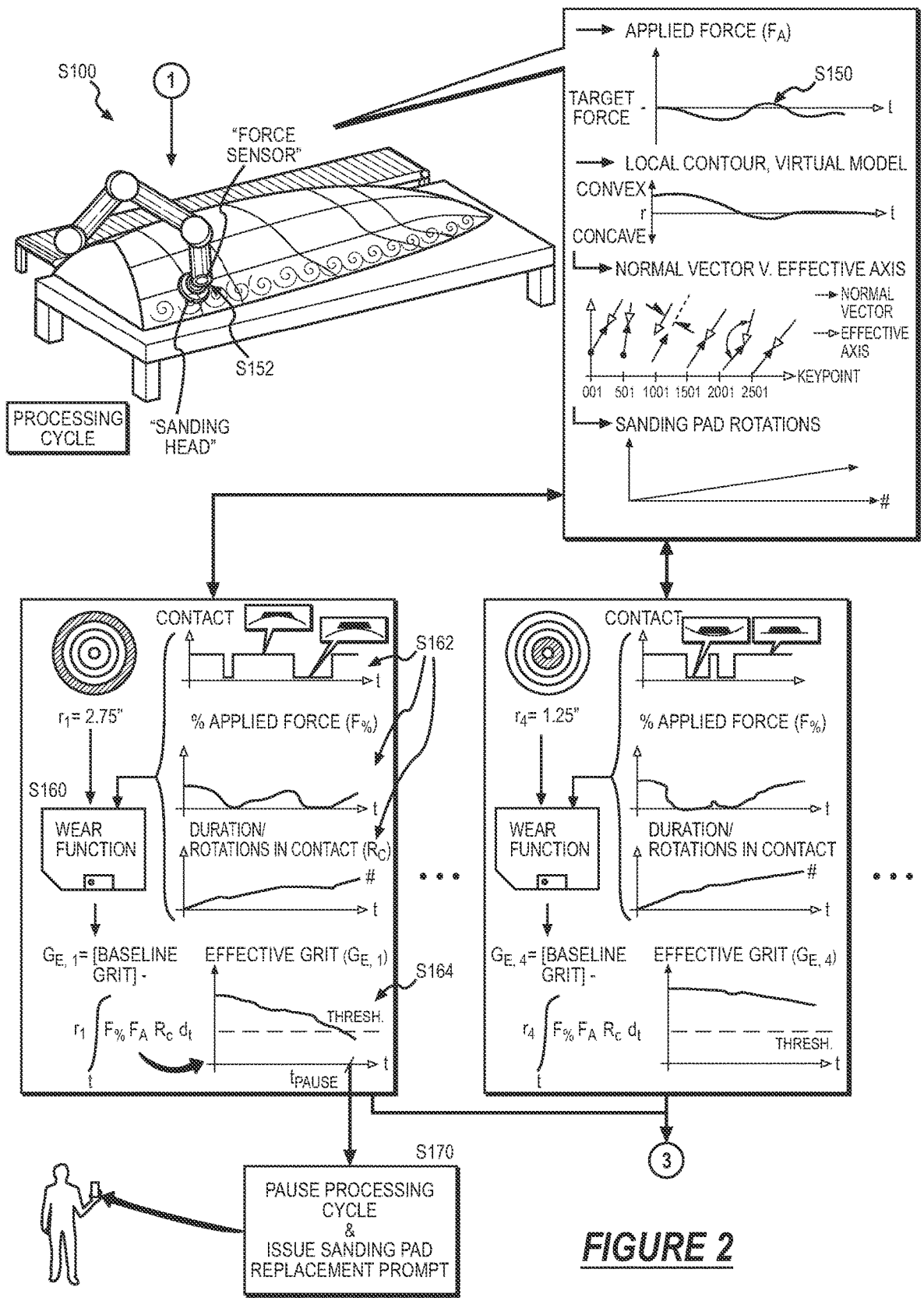
FIG. 2 is a schematic representation of one variation of the method.
Figure 3:
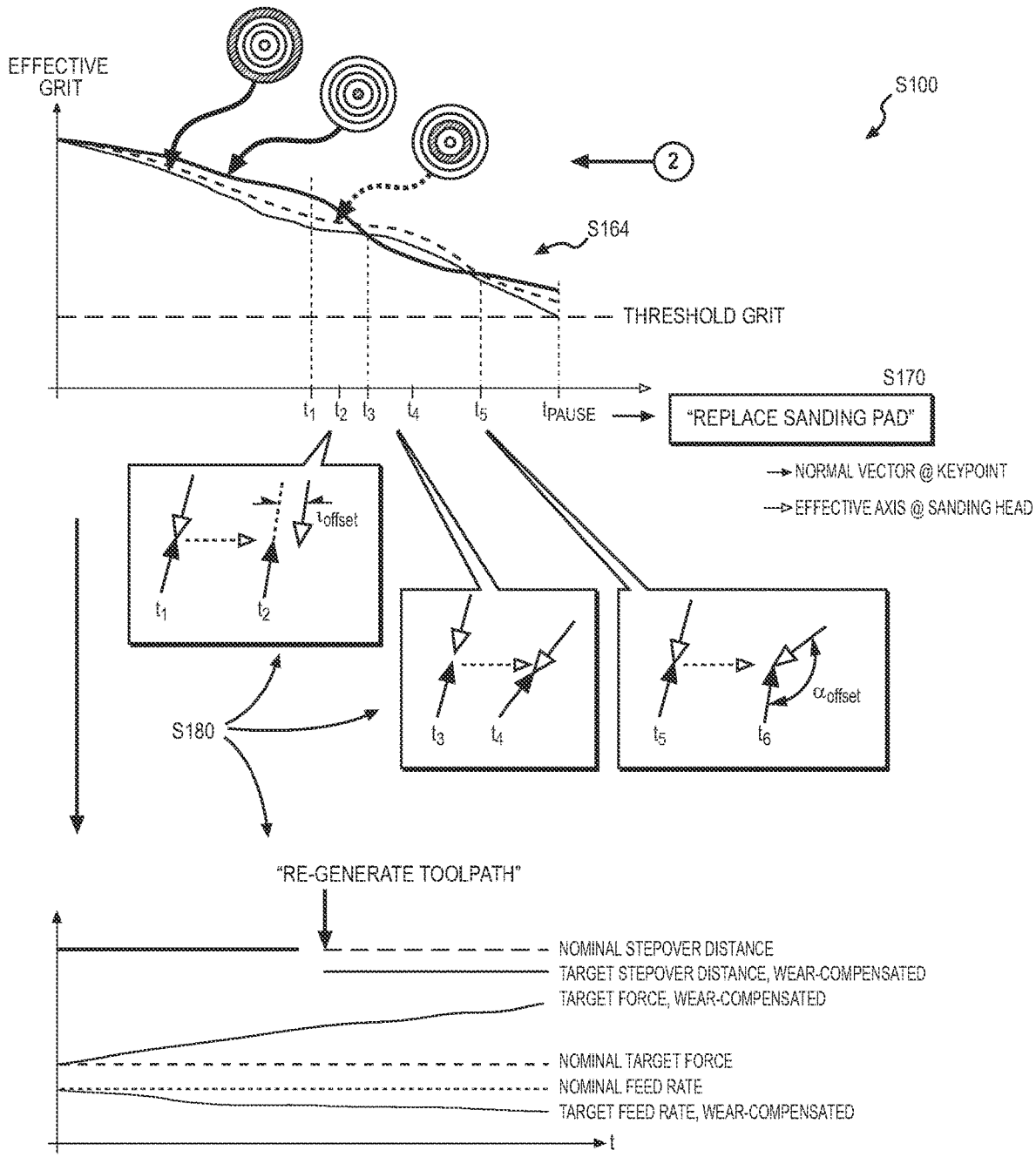
FIG. 3 is a schematic representation of one variation of the method.

As shown in FIGS. 1, 2, and 3, a method S100 includes: accessing a first toolpath for a first workpiece region of a workpiece in Block S140; accessing a first target force assigned to the workpiece in Block S142; and accessing a wear model representing abrasive degradation of a sanding pad arranged on a sanding head in Block S160.

The method S100 also includes, during a processing cycle: accessing a sequence of force values output by a force sensor coupled to a sanding head in Block S150; via a set of actuators coupled to the sanding head, navigating the sanding head across the first workpiece region according to the first toolpath in Block S152 and, based on the sequence of force values, deviating the sanding head from the first toolpath to maintain forces of the sanding head on the first workpiece region proximal the first target force in Block S154; accessing a first sequence of contact characteristics representing contact between a first abrasive area on the sanding pad and the workpiece in Block S162; estimating a first abrasive degradation of the first abrasive area based on the wear model and the first sequence of contact characteristics in Block S164; and, in response to the first abrasive degradation exceeding a threshold degradation, pausing the processing cycle for replacement of the sanding head in Block Silo.

1.1 Variation: Real-time Processing Parameter Control

Another variation of the method S100 FIGS. 1, 2, and 3 includes: accessing a first toolpath for a first workpiece region of a workpiece in Block S140; accessing a first set of processing parameters assigned to the first workpiece region, the first set of processing parameters including a first target force and a first feed rate in Block S142; and accessing a wear model representing abrasive degradation of a sanding pad arranged on a sanding head in Block S160.

This variation of the method S100 also includes, during a processing cycle: accessing a sequence of force values output by a force sensor coupled to a sanding head in Block S150; via a set of actuators coupled to the sanding head, navigating the sanding head across the first workpiece region according to the first toolpath in Block S152 and, based on the sequence of force values, deviating the sanding head from the first toolpath to maintain forces of the sanding head—on the first workpiece region—proximal the first target force in Block S154; accessing a first sequence of contact characteristics representing contact between a first abrasive area on the sanding pad and the workpiece in Block S160; estimating a first abrasive degradation of the first abrasive area based on the wear model and the first sequence of contact characteristics in Block S164; and modifying the first set of processing parameters based on the first abrasive degradation in Block S180.

2. Applications

Generally, an autonomous scanning and sanding system (hereinafter the "system") can execute Blocks of the method S100: to autonomously capture scan data of a workpiece occupying a work cell during a rapid, contactless scan cycle; to compile these scan data into a virtual three-dimensional model of the workpiece; to generate a toolpath spanning surfaces represented in the virtual model and defining a sequence of nominal positions and orientations traversable by a sanding head to sand (hereinafter "process") the workpiece; and to assign a target force for application of the sanding head on the workpiece.

The system can further execute Blocks of the method S100 during a processing cycle: to track forces applied by the sanding head to the workpiece; and to advance and retract the sanding head normal to the workpiece while navigating the sanding head along the toolpath to maintain forces applied by the sanding head to the workpiece at the target force, thereby achieving predictable material removal across the workpiece and a consistent surface finish across the workpiece.

The system also executes Blocks of the method S100 to monitor contact characteristics between a sanding pad and the workpiece during the processing cycle, such as: applied force across the whole sanding pad or discrete areas (e.g., nested annular rings) on the sanding pad; rotations of the whole sanding pad or individual areas of the sanding pad while in contact with the workpiece; durations of time that the whole sanding pad or individual areas of the sanding pad are in contact with the workpiece; distance traversed by the whole sanding pad or by individual areas of the sanding pad area while in contact with the workpiece; and/or feed rate of the whole sanding pad or individual areas of the sanding pad moving across the workpiece while in contact with the workpiece.

The system can further maintain an estimate of effective abrasiveness (or "grit") of the whole sanding pad or individual areas of the sanding pad during the processing cycle based on these contact characteristics and a wear function, such as: an initial baseline abrasiveness of the sanding pad (e.g., "80grit," "220grit") less an integral of applied force and estimated count of rotations of the sanding pad in contact with the workpiece; or an initial baseline abrasiveness of the sanding pad less a combination of applied force and distance traversed, integrated over a workpiece contact duration, for each individual area of the sanding pad.

The system can then modify processing parameters for the workpiece in real-time during the processing cycle based on effective abrasiveness of the whole sanding pad or individual areas, such as by decreasing feed rate, increasing target applied force, and/or decreasing stepover distance between legs of the toolpath proportional to reduction in effective abrasiveness of the sanding pad.

Additionally or alternatively, the system can tilt (e.g., "pitch," "roll") the sanding head relative to the workpiece (e.g., relative to a vector normal to an adjacent local region of the workpiece) to move different annular areas of the sanding pad exhibiting greater effective abrasiveness into (primary) contact with the convex region of the workpiece and thus maintain a more consistent effective abrasiveness across the entire sanding pad during the processing cycle. Similarly, the system can linearly offset a rotational axis of the sanding head relative to a vector normal to an adjacent local region of the workpiece to move different annular areas of the sanding pad exhibiting greater effective abrasiveness into (primary) contact with the workpiece and thus maintain a more consistent effective abrasiveness across the entire sanding pad during the processing cycle. For example, the system can implement this process to linearly and/or angularly offset the rotational axis of the sanding head from normal vectors through a local convex region of the workpiece in order to focus wear to inner annuli of the sanding pad. The system can then return the rotational axis of the sanding head to coaxial with normal vectors through a local concave region of the workpiece in which the outer annuli of the sanding pad—now with high effective abrasiveness than the inner annuli—predominantly or solely contact the workpiece.

Furthermore, in response to the effective abrasiveness of the whole sanding pad or individual areas of the sanding pad falling below a threshold abrasiveness, the system can: pause the processing cycle; generate a prompt, command, or other notification to replace the sanding pad on the sanding head; and serve this prompt to a human operator for completion or to an automatic tool changer for replacement of the sanding pad.

Figure 4:
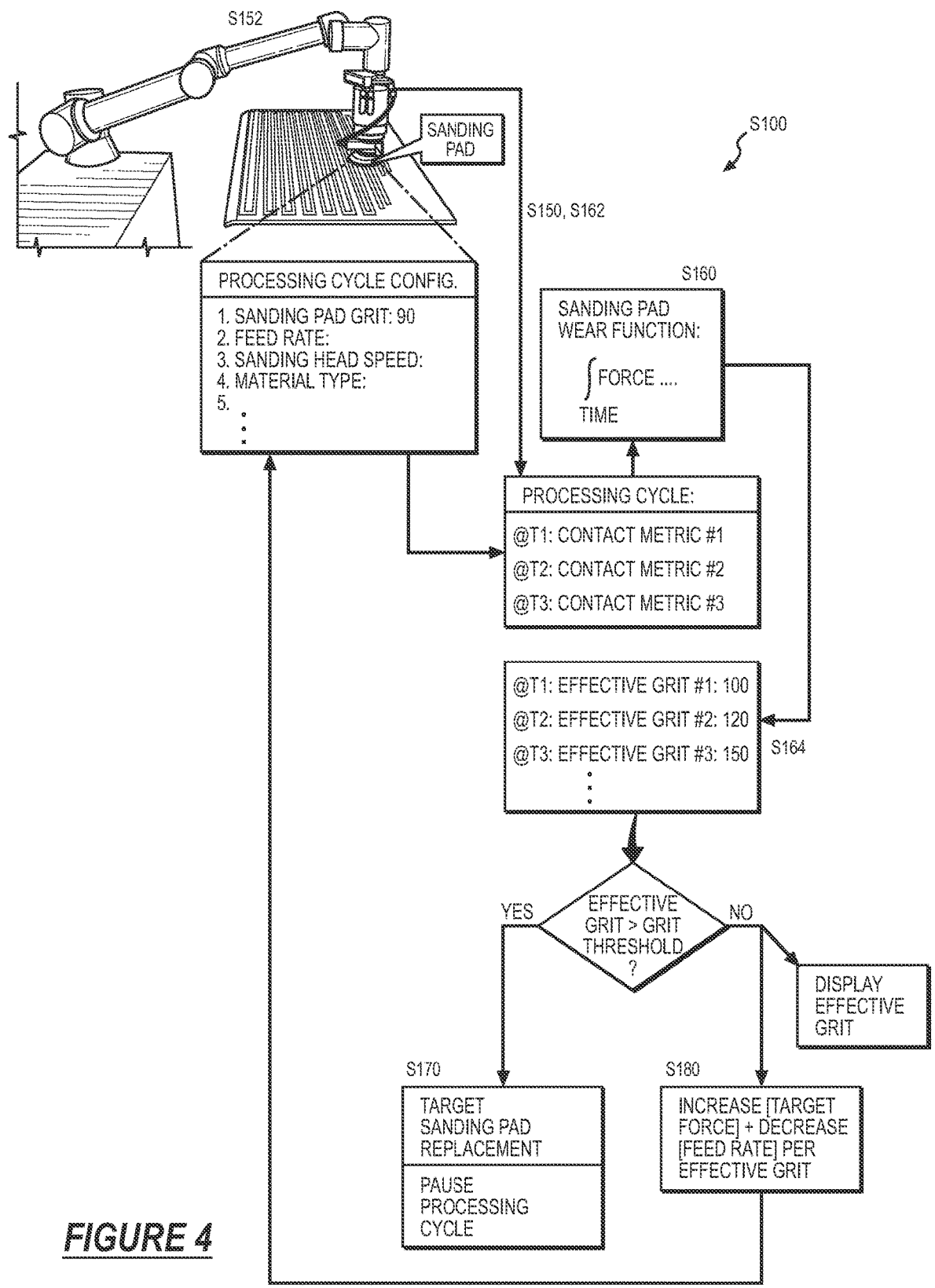
FIG. 4 is a schematic representation of one variation of the method.

Therefore, the system can execute Blocks of the method S100 to: track wear of a sanding pad during a processing cycle while processing (i.e., "sanding") a workpiece; estimate effective abrasiveness of the sanding pad based on this wear; autonomously modify processing parameters for the workpiece in real-time during the processing cycle based on this effective abrasiveness to achieve more consistent wear across the sanding pad, more consistent material removal with the sanding pad, and more consistent surface finish across the workpiece; and selectively pause the processing cycle for replacement of the sanding pad based on this effective abrasiveness (e.g., when replacement of the degraded sanding pad with an unused sanding pad may yield faster, more efficient, and/or more consistent material removal and surface finish on the workpiece), as shown in FIG. 4.

Furthermore, the method is described herein as executed by the system to track and manage wear of a sanding pad arranged on a rotary sanding head. The system can also implement these methods and techniques to track and manage wear of a sanding pad arranged on an orbital or random-orbital sanding head, which may yield sanding pad wear that approximates sanding pad wear on a rotary sanding head or that yields average wear over a sanding pad area that approximate sanding pad wear on a rotary sanding head. The system can also implement these methods and techniques to track and manage wear of sanding pad arranged on an oscillating or other type of sanding head.

2.1 Example

In one implementation, prior to or during the processing cycle, the system can interface with a human operator to set the sanding pad wear threshold for the processing cycle, such as: 100% to minimize material consumption; 90% to balance material removal rate and material consumption; 80% for faster material rate and system efficiency; or 75% for maximum material rate, maximum system efficiency, maximum output surface finish consistency.

During the processing cycle, the system can monitor abrasive degradation (or "wear percentage," "wear level") of the sanding pad while autonomously navigating the sanding pad and sanding head across the workpiece. For example, the system can estimate abrasive degradation of the sanding pad based on: a wear function (or "wear model") associated with a type of sanding pad and/or baseline abrasiveness of the sanding pad; a speed rate (i.e., rotation rate) of the sanding head, a feed rate of the sanding head across the workpiece, an applied force of the sanding head on the workpiece, contact areas of the sanding pad on the workpiece during a processing cycle); and/or characteristics of the workpiece (e.g., surface material type, hardness, abrasive loading tendency).

For example, upon installation of a new sanding pad onto the sanding head, the system can: reset a stored abrasive degradation for the sanding pad to "0%"; and retrieve characteristics (e.g., a material type, hardness, abrasive loading tendency) of a target surface on the workpiece. While navigating the sanding pad across the target surface over a subsequent processing cycle, the system can: monitor contact characteristics (e.g., applied force, rotation count, rotation speed, feed rate) representing characteristics of contact between the sanding pad and the workpiece; and insert these contact characteristics and characteristics of the target surface into a wear function for the sanding pad to calculate abrasive degradation of the sanding pad.

In this example, in response to the abrasive degradation of the sanding pad falling below a threshold degradation (i.e., exceeding a maximum degradation, exceeding a minimum effective abrasiveness), the system can continue to execute the processing cycle with the current sanding pad.

The system can continue to recalculate the abrasive degradation of the sanding pad during the processing cycle. Then, in response to the abrasive degradation of the sanding pad exceeding a wear threshold (e.g., 75%), the system can: pause the processing cycle; generate a notification to replace the sanding pad; and serve this notification to an operator. For example, the system can generate the notification to replace the used sanding pad with a second sanding pad of the same initial or baseline abrasiveness, such as if the system has not yet achieved a target output surface finish across the entire workpiece at a current abrasiveness level. In another example, the system can generate the notification to replace the sanding pad with a sanding pad of a succeeding (e.g., lesser) initial abrasiveness if the system has achieved the target output surface finish (e.g., coating thickness, surface roughness) at the current abrasiveness level. The system can then resume the processing cycle following replacement of the sanding pad.

In one variation, the system can trigger automatic replacement of the first sanding pad with a second sanding pad responsive to abrasive degradation of the current sanding pad exceeding the wear threshold.

In another variation, the system can dynamically adjust processing parameters for the workpiece (e.g., speed rate of the sanding pad, feed rate of the sanding head, force applied by sanding pad to the workpiece), such as to reduce degradation rate of the sanding pad, maintain or increase material removal rate from the workpiece by the sanding pad, and/or improve surface finish consistency across the workpiece.

3. System

In one implementation described in U.S. patent application Ser. No. 18/111,470 and shown in FIGS. 1 and 4, the system includes: a robotic arm arranged in or adjacent a work zone and that includes a set of articulatable joints interposed between a series of arm segments; an end effector supported on a distal end of the robotic arm; a sanding head arranged on or integrated into the end effector and configured to actuate (e.g., rotate) a sanding pad; an optical sensor (e.g., a set of depth sensors and/or color cameras) arranged on or integrated into the end effector and configured to capture optical images (e.g., depth maps, photographic color images) of a workpiece; a force sensor (e.g., a one-dimensional axial force sensor) configured to output a signal representing a force applied by the sanding head to a workpiece normal to the sanding head; a set of position sensors configured to output signals representing (or assemblable into) a three-dimensional position of the end effector; a display configured to render a user interface accessible by an operator; and/or a controller configured to execute Blocks of the method S100.

In this implementation, the system can also include a conveyor configured to traverse the robotic arm longitudinally along the work zone, such as to reach and process an elongated part defining a high length-to-width ratio (e.g., a high aspect ratio), such as a boat hull or aircraft wing.

In another implementation, the system includes a multi-axis (e.g., five-axis) gantry configured to locate and articulate the end effector, sanding head, and optical sensor(s) across the work zone.

However, the system can include or define any other element or structure.

4. Workpiece Loading and Processing Inputs

In one variation, the system retrieves processing inputs and/or other parameters for autonomously sanding the workpiece, such as once an operator loads the workpiece into the work zone adjacent the system.

In particular, in preparation for autonomously processing (e.g., sanding) a workpiece by the system, an operator locates the workpiece in the work zone adjacent to the system. For example, the operator may: load the workpiece onto a support rig (e.g., a wheeled table) and install intermittent clamps on the workpiece to retain the workpiece on the support rig; place the support rig and workpiece into the work zone; and lock wheels of the support rig.

4.1 Processing Limits

The system can then prompt the operator to supply processing limits for the workpiece, such as including: a maximum applied force (i.e., a maximum force applied by the sanding head to any region of the workpiece); a maximum applied pressure (e.g., a maximum force applied by the sanding head to any unit area of the workpiece); and a maximum deformation of the workpiece (e.g., a maximum distance of a point on the workpiece in an unloaded position to a loaded position when the system applies the sanding head to the workpiece). For example, the operator can supply these processing limits based on known material properties and compliance characteristics of the workpiece.

Additionally or alternatively, the system can retrieve these processing limits from a predefined processing profile. For example, the system can select a predefined processing profile stored in a processing profile database based on: a material of the workpiece (e.g., fiberglass, steel, aluminum) and/or a nominal wall thickness of the workpiece selected by the operator; or a length, aspect ratio, and/or a geometry profile of the workpiece (e.g., concave with high aspect ratio, convex with high aspect ratio, concave with low aspect ratio, convex with low aspect ratio) entered by the operator or derived from a scan of the workpiece completed by the system. The system can then load processing limits extracted from this processing profile.

4.2 Material Removal Targets

In another implementation, the system prompts the operator to manually input properties of and/or processing targets for the workpiece (e.g., through a set of dropdown menus), such as: material type; coating type (e.g., none, gel coat, epoxy, primer, base coat, clear coat); target, maximum, and/or minimum material removal depth (e.g., 0.002" to 0.010"); and/or output surface quality (e.g., sanded to 80-, 150-, 220-, 320-, or 400-grit; buffed; polished). Alternatively, the system can prompt the operator to select a material removal profile—such as from a set of material removal profiles stored in a processing database—containing these data.

The system can then select a sanding pad of a sanding grit corresponding to the target output surface quality and implement methods and techniques described below to generate a nominal toolpath and set a nominal target force for processing the workpiece based on: this sanding grit; the target, maximum, and/or minimum material removal depth; and/or a maximum applied force or pressure set for the workpiece.

However, the system can retrieve or load processing limits for the workpiece based on any other data supplied by the operator or collected autonomously by the system during a scan cycle as described below.

5. Workpiece Scan

Blocks S112, S110, and S120 of the method S100 recite: navigating an end effector over a workpiece; accessing a set of images captured by an optical sensor arranged on the end effector while traversing the workpiece; and compiling the set of images into a virtual model representing unloaded surfaces of the workpiece. Generally, in Blocks S112, S110, and S120, the system can implement methods and techniques described in U.S. patent application Ser. No. 18/111,470 to: autonomously navigate an optical sensor (e.g., a depth sensor and/or a color camera) over the workpiece; capture optical images (e.g., depth maps, photographic color images) of the workpiece; and assemble these optical images into a virtual three-dimensional model that represents surfaces of the workpiece, as shown in FIG. 1.

For example, after the operator loads the workpiece into the work zone and confirms processing limits for the workpiece, the system can initiate a scan cycle. During the scan cycle, the system can: navigate the optical sensor—located on the end effector—along the scan path over and offset above the workpiece; monitor a distance between the end effector and the workpiece based on depth data collected by the optical sensor; and implement closed-loop controls to maintain a target offset distance between the optical sensor and the workpiece (e.g., 20″, 50 centimeters). In this example, for a workpiece defining an elongated geometry including a long axis located approximately parallel to a longitudinal axis of the work zone, the system can actuate a conveyor supporting the robotic arm to traverse the robotic arm along the longitudinal axis of the work zone while rastering the end effector and the optical sensor laterally across the work zone to capture a sequence of optical images representing all surfaces of the workpiece accessible by a sanding head on the end effector.

The system can thus capture scan data—such as color photographic images, stereoscopic images, two-dimensional infrared images, depth maps, and/or LIDAR images—from a set of optical sensors arranged on the end effector while traversing the end effector across (e.g., over and not in contact with) the workpiece. For example, the system can capture depth maps at a rate of 2 Hz while traversing the end effector across the workpiece at a rate of three feet per second at a target offset distance of three feet between the end effector and the workpiece, which corresponds to a nominal sensor field of view of three feet by three feet and thus yields approximately 50% overlap between consecutive depth maps captured by the system during the scan cycle.

The system then compiles these optical images into a virtual three-dimensional model of the workpiece as described in U.S. patent application Ser. No. 18/111,470, such as by implementing structure-from-motion techniques or by fusing these optical images into the virtual model based on poses of the robotic arm when these optical images were captured. For example, the system can compile this set of optical images into a three-dimensional mesh within a virtual three-dimensional space.

However, the system can implement any other methods or techniques to navigate the end effector and optical sensor over the workpiece, to collect optical images of the workpiece, and to generate a virtual three-dimensional model of the workpiece based on these optical images.

6. Nominal Workpiece Segmentation

In one variation shown in FIG. 1, the system segments the workpiece into workpiece regions. For example, the system can segment the virtual model of the workpiece into: approximately-flat regions; concave regions; convex regions; workpiece perimeter regions; regions containing edges; and/or regions containing orifices or apertures. In another example, the system can: define a first workpiece region containing a contiguous convex surface; define a second workpiece region containing a contiguous concave surface; and define a third workpiece region containing a contiguous surface approximating a planar geometry (e.g., defining a large effective radius); etc. In yet another example, the system can: define a first contiguous workpiece region characterized by high detected, predicted, or annotated stiffness; define a second contiguous workpiece region characterized by moderate detected, predicted, or annotated stiffness; and define a third contiguous workpiece region characterized by low detected, predicted, or annotated stiffness; etc. In another example, the system can project a predefined boundary grid onto the virtual model and define workpiece regions according to boundaries defined in this boundary grid.

In the foregoing examples, the system can also define workpiece regions spanning target widths, lengths, and/or surfaces areas spanning less than maximum widths, lengths, and/or surfaces areas.

However, the system can segment the workpiece in any other way and according to any other workpiece characteristics.

The system can then define a toolpath, assign a target force, and set a feed rate of the sanding head for each workpiece region.

7. Target Force Parameters

Block S142 of the method S100 recites: assigning a first target force to the first workpiece region. Generally, in Block S142, the system assigns target forces to workpiece regions of the workpiece, such as: based on autonomously-detected, manually-indicated, or derived (e.g., interpolated) maximum compliance (or minimum stiffness) characteristics of these regions; based on geometries (e.g., concave and convex contours, profiles) in these regions of the workpiece; and/or based on a material or part type of the workpiece.

In one implementation, the system retrieves a single nominal target force from the predefined processing profile described above and assigns this target force to the entire workpiece, as shown in FIG. 1.

In another implementation, the system defines boundaries between contiguous regions of the workpiece exhibiting similar contours, such as between contiguous concave, convex, and approximately flat regions of the workpiece spanning more than a minimum surface area (e.g., four square feet). The system then assigns target forces to each region, such as: highest forces in concave regions that may be least susceptible to plastic deformation due to high force application by the sanding head; moderate forces in flat regions that may be more susceptible to plastic deformation due to force application by the sanding head; lowest forces in convex regions that may be most susceptible to plastic deformation due to high force application by the sanding head; and/or force magnitudes within a region proportional to the smallest radius within the region. The system can also annotate these regions and corresponding target forces in the virtual model of the workpiece.

Additionally or alternatively, the system can retrieve or calculate a target nominal force for each region of the workpiece, such as: proportional to a detected or indicated stiffness in a workpiece region; or proportional to a minimum effective radius of the workpiece region.

8. Nominal Toolpath Generation

The system can further implement methods and techniques described in U.S. patent application Ser. No. 18/111,470 to define a toolpath within each region of the workpiece.

In one implementation shown in FIG. 1, the system sets a nominal target force—for application of the sanding head on the workpiece—less than the maximum applied force and/or based on (e.g., inversely proportional to) an operator-indicated or system-derived stiffness of a region of the workpiece. The system further: retrieves a function that relates contact duration (i.e., a time or rotation count of a sanding pad in contact with a workpiece), applied force (or pressure), nominal sanding pad abrasiveness, and material removal depth; selects a nominal sanding pad abrasiveness for the workpiece based on an output surface quality selected for the workpiece by the operator; and calculates a nominal contact duration for the workpiece based on the nominal target force, the nominal sanding pad abrasiveness, and the target material removal depth.

The system then sets or calculates a combination of pitch offset between legs of a toolpath (or "stepover distance") and a feed rate for the toolpath that yields the nominal contact duration. In particular, a higher feed rate may yield less contact time between the sanding head and a unit area of the workpiece; and vice versa. Similarly, a wider stepover distance for the toolpath may yield less contact time between the sanding head and a unit area of the workpiece; and vice versa. For example, the system can set a feed rate and a stepover distance—inversely proportional to feed rate—based on feed rate preferences set by the operator. Alternatively, the system can: set a lower feed rate and wider stepover distance for segments of a toolpath intersecting a region of the workpiece characterized by a large radius in which a large proportion of the sanding pad is in contact with the workpiece; and set a higher feed rate and narrower stepover distance for segments of a toolpath intersecting a region of the workpiece characterized by a small radius in which a smaller proportion of the sanding pad is in contact with the workpiece. The system can therefore set or retrieve a nominal target force, a stepover distance, and a feed rate for each region of the workpiece.

The system then generates a nominal toolpath for each region of the workpiece. In one implementation, the system: defines a serpentine or boustrophedonic toolpath within a first region of the workpiece according to a stepover distance set for the first workpiece region; and stores this first toolpath as a first set of keypoints, wherein each keypoint represents a vertex or other point on the toolpath, defines a three-dimensional position on the workpiece, includes a vector normal to the workpiece at this three-dimensional position, and is labeled with the target force and the feed rate set for the first region. More specifically, the system can project the first toolpath onto the first region of the workpiece represented in the virtual model. The system can then extract a three-dimensional position and normal vector of each vertex or other point on the first toolpath from the virtual model. Accordingly, the system can store the first toolpath for the first workpiece region as a first ordered sequence of keypoints: located on a first surface of the workpiece stored in (i.e., represented by) the virtual model; and contained within the first workpiece region.

In one variation, the system can iteratively adjust this first toolpath based on local radii of the workpiece along segments of the first toolpath. Additionally or alternatively, the system can adjust target forces assigned to segments of the first toolpath: proportional to local radii of convex subregions of the workpiece adjacent these toolpath segments; and inversely proportional to radii of concave subregions of the workpiece adjacent these toolpath segments. Accordingly, the system can set a force greater than the nominal target force within a concave subregion of the workpiece and a target force less than the nominal target force within a convex subregion of the workpiece.

In one example, the system accesses an abrasive specification (or "abrasiveness," "grit") of a sanding pad and a target material removal depth from the workpiece, such as selected by the operator directly, extracted from a processing profile selected by the operator, or selected autonomously by the system as described above. The system then: sets or calculates a first target force for a first region of the workpiece based on the abrasive specification of the sanding pad and proportional to the target material removal depth for the workpiece; sets or calculates a first target stepover distance for the first region of the workpiece based on the abrasive specification of the sanding pad, inversely proportional to the target material removal depth for the workpiece, and proportional to the first target force; calculates a feed rate for the first workpiece region proportional to the first target force and inversely proportional to the target material removal depth for the workpiece; generates a first toolpath defining a boustrophedonic pattern—characterized by the first stepover distance—for the first workpiece region based on a geometry of contour of the first workpiece region represented in the virtual model; and assigns the first target force and the first feed rate to the first toolpath. The system can repeat the foregoing process(es) for each other region of the workpiece.

Alternatively, the system can implement the foregoing methods and techniques to generate a single continuous toolpath spanning the entire workpiece or spanning another partial or complete surface of the workpiece selected for autonomous processing by the system.

9. Nominal Processing Cycle

Block S150 of the method S100, recites accessing a first sequence of force values output by a force sensor coupled to a sanding head arranged on the end effector. Blocks S152 and S154 of the method S100, recite, via a set of actuators coupled to the end effector: navigating the sanding head across the first workpiece region according to the first toolpath; and, based on the first sequence of force values, deviating the sanding head from the first toolpath to maintain forces of the sanding head on the first workpiece region proximal the first target force.

Generally, in Blocks S150, S152, and S154, the system can implement methods and techniques described in U.S. patent application Ser. No. 18/111,470 to autonomously navigate the sanding head along a toolpath (e.g., a sequence of keypoints) defined within a region of the workpiece and to maintain a target normal force between the sanding head and the workpiece by selectively moving the sanding head into and away from the workpiece normal to the surface of the workpiece represented in the virtual model, as shown in FIG. 2.

The system also implements closed-loop controls to maintain a target force between the sanding head and the workpiece within each workpiece region—based on force values read from the force sensor integrated into the sanding head—by driving the sanding head toward and away from the workpiece along vectors normal to the workpiece, such as represented in keypoints of these toolpaths or extracted from the virtual model during the processing cycle. For example, for a first keypoint in the first ordered sequence of keypoints, the system can drive the set of actuators to: locate the sanding head at a first three-dimensional position intersecting the first keypoint; align an axis of the sanding head to a first vector contained in the first keypoint; and drive the sanding head, coaxial with the first vector, toward the workpiece to match force values, in a sequence of force values read from the force sensor in the sanding head, to a first target force assigned to a first toolpath containing the first keypoint. The system can then drive the set of actuators to interpolate a three-dimensional path and sanding head orientation from the first keypoint to the second keypoint while implementing closed-loop controls to apply the sanding head to the workpiece with the first target force. The system can repeat this process for each other keypoint defined along the first toolpath and then along subsequent toolpaths defined for other regions of the workpiece.

In a similar implementation, in Block S140, the system defines a first ordered sequence of keypoints located on the virtual model. For each keypoint in the first ordered sequence of keypoints, the system: calculates a vector normal to the virtual model at a location of the keypoint on the virtual model; and stores the vector in the keypoint. The system then stores the first ordered sequence of keypoints as the first toolpath. Then, for a first keypoint in the first ordered sequence of keypoints, the system: locates the sanding head at a first position intersecting the first keypoint in Block S152; aligns an axis of the sanding head to a first vector contained in the first keypoint; and drives the sanding head, coaxial with the first vector, toward the workpiece to match force values, in the first sequence of force values read from the force sensor, to the first target force in Block S154.

10. Wear Function

Block S160 of the method S100 recites accessing a wear model representing abrasive degradation of a sanding pad arranged on a sanding head. Generally, in Block S160, the system can retrieve a parametric function (or "model") that predicts real-time abrasiveness of an area on a sanding pad, such as based on: an initial or baseline abrasiveness (or "grit") of the sanding head; a force applied by the area of the sanding pad to the workpiece over time; a quantity of revolutions made by the area of the sanding pad while in contact with the workpiece; a distance traversed by the area of the sanding pad while in contact with the workpiece; a duration of time that the area of the sanding pad has been in contact with the workpiece; a hardness of a material on the surface of the workpiece; and/or an abrasive loading (or "clogging") tendency of the material on the surface of the workpiece; etc.

In particular, prior to application on the workpiece during a processing cycle, a sanding pad may exhibit an initial (or "baseline," "nominal," or "starting") abrasiveness that corresponds to an initial cutting capacity of the sanding pad, such as represented by a "grit" value corresponding to a coarseness of the sanding pad. For example, lower grit values (e.g., "40," "60") represent coarser abrasives that may remove larger amounts of material per rotation or application duration. Conversely, higher grit values (e.g., "320," "1500") represent finer abrasives that may remove lesser amounts of material per rotation or application duration. However, a sanding pad may degrade in effective cutting capacity and thus decrease in effective abrasiveness during a processing cycle, such as due to wear of the sanding pad and/or due to "clogging" of the sanding pad by material removed from a workpiece by the sanding pad.

Therefore, the system can access and implement a wear function that predicts degradation (e.g., change in effective abrasiveness) of a unit area of a sanding pad as a function of: the initial abrasiveness of the sanding pad; contact characteristics between the unit area of the sanding pad and a workpiece (e.g., applied force, contact duration, contact distance, contact rotation count, surface speed); and/or characteristics of the workpiece (e.g., abrasive loading tendency, hardness). Accordingly, the system can implement this wear function to estimate effective abrasiveness of the whole sanding pad or individual areas of the sanding pad over time throughout a processing cycle.

For example, the wear function can include a parametric model that relates initial abrasiveness, variable contact characteristics described below, and fixed workpiece characteristics (or "inputs") to an effective abrasiveness of the sanding pad (or an "output"). In another example, the wear function can include a neural network, and the system can implement the wear function and artificial intelligence techniques to estimate the effective abrasiveness of the sanding pad based on initial abrasiveness, contact characteristic, and workpiece characteristic data.

10.1 Sanding Pad Annular Areas

The system can implement the wear function to predict an effective abrasiveness across an entire area of the sanding pad during a processing cycle.

Alternatively and as shown in FIG. 2, the system can: represent the sanding pad as an array of (e.g., two, ten, 1,000) concentric annular areas (or "annuli") rotating about a common axis of the sanding head; and implement the wear function to predict an effect abrasiveness of each annular area of the sanding pad during a processing cycle.

More specifically, the system can implement the wear function and contact characteristics of each annular area of the sanding pad during the processing cycle to estimate effective abrasiveness of individual, discrete areas on the sanding pad. Furthermore, each annular area of the sanding pad may: carry different forces into the workpiece based on local contours of the workpiece and compliance of a backing between the sanding pad and the sanding head; may move across the surface of the workpiece at different surface speeds based on a radial distance of the annular area from an rotational axis of the sanding head; and may contact the workpiece over different time durations based on local contours of the workpiece. Accordingly, the system can track contact characteristics for these individual annular areas and update abrasiveness estimates for these individual annular areas accordingly during a processing cycle.

For example, during operation of the sanding head, each annular area on the sanding pad may exhibit a different linear surface speed on the workpiece (i.e., based on effective radius of the annular area and the rotational speed of the sanding head). Similarly, during operation of the sanding head, each annular area on the sanding pad may carry a different proportion of the total force—of the sanding head on the workpiece—into the workpiece based on a local contour (or "shape," "geometry") of the workpiece in contact with the sanding pad, which may be represented in the virtual model. The system can therefore monitor contact characteristics input for individual annular areas of the sanding pad and input these contact characteristics into the wear function to estimate effective abrasiveness of each annular area of the sanding pad during a processing cycle.

In similar variations, the system can: define nested elliptical annular areas on a sanding pad arranged on an orbital sander or define a column of rectangular areas on a sanding pad arranged on a linear vibratory sanding head; and implement methods and techniques described herein to predict or monitor effective abrasiveness of these areas of such sanding pads based on motion of the sanding head and the robotic arm.

11. Wear Prediction

Blocks S162 and S164 of the method S100 recite: accessing a first sequence of contact characteristics representing contact between a first abrasive area on the sanding pad and the workpiece; and estimating a first abrasive degradation of the first abrasive area based on the wear model and the first sequence of contact characteristics. Generally, in Blocks S162 and S164, the system can track contact characteristics for an area of the sanding pad and insert these contact characteristics into the wear function to estimate a current abrasiveness of this area of the wear function, respectively, as shown in FIG. 2.

11.1 Rotation Count

In one implementation, the wear function outputs an abrasiveness of an area of a sanding pad as a function of count of rotations of the area of the sanding pad while in contact with the workpiece. For example, the wear function can output an abrasiveness of an area of a sanding pad as a function of: the initial abrasiveness of the sanding pad; less a product of abrasive loading tendency of the workpiece and force applied to the workpiece by the sanding pad area, integrated over count of rotations of the sanding head.

In one implementation, the system can estimate a total area of the sanding pad in contact with the workpiece during a rotation of the sanding pad based on a local geometry of the workpiece adjacent the sanding pad, as stored in the virtual model, and an orientation of the sanding head on the workpiece. The system can then estimate a proportion of the total force—applied by the sanding pad to the workpiece—carried by the discrete area of the sanding pad during the rotation of the sanding pad based on the local geometry of the workpiece.

For example, the system can estimate: a higher proportion of the total applied force for an outermost annular area on the sanding pad applied to a concave region of the workpiece; a higher proportion of the total applied force for an innermost annular area on the sanding pad applied to a convex region of the workpiece; a lower proportion of the total applied force for an innermost annular area on the sanding pad applied to a concave region of the workpiece; and a lower proportion of the total applied force for an outermost annular area on the sanding pad applied to a convex region of the workpiece. The system then: calculates a combination of these forces and an abrasive loading factor of the workpiece surface material; integrates this combination by a count of rotations of the sanding head; and subtracts this result from a nominal or baseline abrasiveness of the sanding pad to estimate a current abrasiveness of the abrasive area.

In another implementation, the system detects contact between the workpiece and a first abrasive area (e.g., a first abrasive area) on the sanding pad during a first sequence of rotations of the sanding pad on the sanding head based on: a position of the first abrasive area on the sanding pad; a first geometry of a first segment of the workpiece—adjacent the sanding head during this first sequence of rotations—represented in the virtual model; a first orientation of the sanding head relative to the first segment of the workpiece during the first sequence of rotations; and a first effective radius of the first abrasiveness area on the sanding pad. Then, in response to detecting contact between the workpiece and the first abrasive area during the first sequence of rotations, the system generates a first contact characteristic that includes a first count of the first sequence of rotations corresponding to contact between the workpiece and the first abrasive area. The system can also estimate a first force component—in a first sequence of force values—applied by the first abrasive area to the workpiece during the first sequence of rotations based on a ratio of the first abrasive area to a total area of the sanding pad or to a total area of the sanding pad in contact with the workpiece during the sequence of rotations. According to the wear model, the system can estimate a first abrasive degradation of the first abrasive area during the first sequence of rotations: proportional to the first force component of the first sequence of force values output by the force sensor during the first sequence of rotations; and proportional to the first count of the first sequence of rotations represented in the first contact characteristic. The system can then subtract this first abrasive degradation from a store abrasiveness of the first abrasive area of the sanding pad to calculate an updated abrasiveness estimate for the first abrasive area.

Furthermore, in this example, the system can detect absence of contact between the workpiece and the first abrasive area during a second sequence of rotations of the sanding pad on the sanding head based on: the position of the first abrasive area on the sanding pad; a second geometry of a second segment of the workpiece—adjacent the sanding head during this second sequence of rotations—represented in the virtual model; a second orientation of the sanding head relative to the second segment of the workpiece during the second sequence of rotations; the first effective radius of the first abrasive area on the sanding pad. Then, in response to detecting absence of contact between the workpiece and the first abrasive area during the second sequence of rotations, the system: generates a second contact characteristic that includes a null count of rotations corresponding to contact between the workpiece and the first abrasive area; and estimates null (i.e., no) degradation of the first abrasive area during the second sequence of rotations based on the second contact characteristic and the wear model.

11.2 Contact Duration

In a similar implementation, the system estimates an abrasiveness of an abrasive area on the sanding pad based on a duration that the abrasive area is in contact with the workpiece. For example, the wear function can output an abrasiveness of an area of a sanding pad as a function of: the initial abrasiveness of the sanding pad; less a product of abrasive loading tendency of the workpiece and force applied to the workpiece by the sanding pad area, integrated over time.

In one example, the system implements methods and techniques described above to detect contact between the workpiece and the first abrasive area during a first time period based on: a position of the first abrasive area on the sanding pad; a first geometry of a first segment of the workpiece, adjacent the sanding head during the first time period, represented in the virtual model; a first orientation of the sanding head relative to the first segment of the workpiece during the first time period; and/or a first effective radius of the first annular area on the sanding pad. The system can also implement methods and techniques described above to estimate a first force component applied by the first abrasive area to the workpiece during the first time period, such as based on a ratio of the first abrasive area to a total area of the sanding pad. Then, in response to detecting contact between the workpiece and the first abrasive area during the first time period, the system generates a first contact characteristic that represents a first duration of the first time period. Based on the wear model, the system then estimates a first abrasive degradation of the first abrasive area during the first time period: proportional to a first sequence of force values output by the force sensor during the first time period; and proportional to the first duration of the first time period represented in the first contact characteristic. For example, the system can estimate the first abrasive degradation of the first abrasive area during the first time period based on an integral of the first force component over the first duration.

11.3 Surface Speed

In yet another implementation, the system estimates a change in abrasiveness of an abrasive area of the sanding pad based on a combination of a force applied by the abrasive area to the workpiece and a speed of the abrasive area moving across the workpiece, integrated over time. For example, the system can calculate a speed of the abrasive area based on a combination of: a rotational speed of the sanding head multiplied by an effective radius of the abrasive area; and a linear speed of the sanding head moving across the workpiece.

However, the system can: track any other contact characteristics of the sanding pad—of the abrasive area more specifically—in contact with the workpiece; and/or implement any other method or technique to estimate the current abrasiveness or change in abrasiveness of an abrasive area on the sanding pad.

The system can also execute the foregoing processes for each discrete abrasive area on the sanding pad during the processing cycle.

12. Real-time Processing Parameter Adjustment

One variation of the method S100 shown in FIGS. 3 and 4 includes Block S180, which recites modifying the first set of processing parameters based on the first abrasive degradation. Generally, in Block S180, the system can modify processing parameters for the workpiece—such as target force, feed rate, toolpath stepover distance, and/or sanding head orientation relative to the workpiece—in real-time during the processing cycle based on abrasive degradation across the sanding pad.

12.1 Target Force

In one implementation shown in FIG. 3, during the processing cycle, the system can increase a target force assigned to a workpiece region proportional to the abrasive degradation of the sanding pad. More specifically, as the sanding pad wears and thus yields reduced material removal, the system can increase the target force applied by the sanding head to the workpiece in order to maintain a (more) consistent material removal rate via the sanding pad during the processing cycle.

For example, the system can: set or access a target material removal rate from the workpiece during the processing cycle; and access a material removal model that associates abrasiveness, applied force, sanding head rotation speed, feed rate, and/or workpiece surface material type to material removal rate (e.g., removal depth per unit time or removed material volume per unit time). The system can then: calculate an effective abrasiveness of the sanding pad, such as a minimum or average abrasiveness of the array of abrasive areas of the sanding pad described above; and implement the material removal model to calculate changes (e.g., increases) in target force predicted to yield the target material removal rate based on reduced effective abrasiveness of the sanding pad over time. The system can then implement closed-loop controls to apply the sanding head to the workpiece according to this revised target force. The system can also regularly revise this target force during the processing cycle, such as once per second.

In this example, the system can therefore increase the target force assigned to a region of the workpiece proportional to abrasive degradation of the sanding pad. Furthermore, the system can: access a force limit for the workpiece; and then pause the processing cycle for replacement of the sanding pad in response to this updated target force approaching the force limit (i.e., in response to abrasiveness degradation of the sanding pad requiring an increase in applied force—to maintain a consistent material removal rate—that approaches the force limit).

12.2 Feed Rate

Additionally or alternatively, the system can decrease the feed rate—at which the system traverses the sanding head across the workpiece—proportional to abrasive degradation of the sanding pad.

For example, the system can: retrieve a target material removal depth for the workpiece; calculate an effective abrasiveness of the sanding pad throughout the processing cycle; and implement the material removal model described above to calculate changes (e.g., decreases) in feed rate predicted to yield the target material removal depth from the workpiece based on the reduced effective abrasiveness of the sanding pad. The system can then navigate the sanding head across the workpiece according to this revised feed rate.

The system can also regularly revise this feed rate during the processing cycle, such as once per second.

12.3 Stepover+Toolpath

Additionally or alternatively, the system can: decrease a toolpath stepover distance—between legs of the toolpath—proportional to abrasive degradation of the sanding pad; and recalculate the toolpath accordingly during the processing cycle.

For example, the system can: retrieve a target material removal depth for the workpiece; calculate an effective abrasiveness of the sanding pad throughout the processing cycle; and implement the material removal model described above to calculate a material removal rate from the workpiece based on the reduced effective abrasiveness of the sanding pad. The system can then: calculate a reduced stepover distance between legs of the workpiece that yields overlapping areas of contact of the sanding pad on the workpiece sufficient to yield the target material removal from the workpiece; implements methods and techniques described above to regenerate the toolpath—for the remaining unprocessed region of the workpiece—according to this revised stepover distance; and then transitions to traversing the sanding head across the workpiece according to this revised toolpath.

The system can also regularly revise the toolpath during the processing cycle, such as once per minute.

The system can also execute the foregoing processing parameter adjustments concurrently, such as by: increasing the target force proportional to the abrasive degradation of the sanding pad; decreasing the feed rate of the sanding head proportional to the abrasive degradation of the sanding pad; and decreasing the stepover distance of the toolpath proportional to the abrasive degradation of the sanding pad.

12.4 Sanding Head Effective Axis Offset

As shown in FIGS. 2 and 3, the system can also implement closed-loop controls to modify a position and/or an orientation of the sanding head relative to a local region of the workpiece, such as: to achieve consistent wear—and therefore consistent abrasiveness—across the entire sanding pad; to expose the local region of the workpiece to a more or less abrasive area of the sanding pad for faster or slower material removal from this region of the workpiece; or to selectively localize wear to a first (e.g., center) area of the sanding pad when processing a first (e.g., convex) region of the workpiece in order to preserve abrasiveness of a second (e.g., outer) area of the sanding pad when processing a second (e.g., concave) region of the workpiece later during the processing cycle.

Generally and as described above, the system can generate a toolpath containing a sequence of keypoints, each including: a three-dimensional point on a surface of the virtual model of the workpiece; and defining a three-dimensional vector normal to the virtual model at the three-dimensional point. Accordingly, during the processing cycle, the system can: interpolate normal vectors between the vector contained at each keypoint; and navigate the sanding head across the workpiece such that an effective axis of the sanding head (e.g., a rotational axis of the sanding pad) is coaxial with the normal vector defined at each keypoint and each interpolated normal vector between these keypoints. In this variation, the system can also linearly or rotationally offset the effective axis of the sanding head from these normal vectors in order to shift contact between abrasive areas of the sanding pad and the workpiece and thus control rates of wear within these abrasive areas of the sanding pad. For example, the system can implement these methods and techniques when processing a convex region of the workpiece in order to preferentially increase wear across inner areas of the sanding pad and maintain a higher effective abrasiveness in the other areas of the sanding pad in preparation for subsequently processing a concave region of the workpiece.

In one implementation, the system can generate the toolpath that includes a sequence of keypoints, wherein each keypoint defines a three-dimensional position on the virtual model and a vector normal to the three-dimensional position on the virtual model. During the processing cycle, the system can: interpolate a subsequence of normal vectors between a first vector of a first keypoint and a second vector of a second keypoint in the sequence of keypoints; and navigate the sanding head to the first keypoint. Furthermore, while navigating the sanding head from the first keypoint to the second keypoint, the system can: align the effective axis of the sanding head coaxial with the subsequence of normal vectors; and translate the sanding head—parallel to the subsequence of normal vectors—to maintain forces of the sanding head on the workpiece proximal the target force.

In this implementation, the system can also implement methods and techniques described above to estimate a first abrasive degradation of a first annular area on the sanding pad based on the wear model, a first sequence of contact characteristics representing contact between the first annular area and the workpiece, and a first effective radius of the first annular area. The system can similarly implement methods and techniques described above to estimate a second abrasive degradation of a second annular area on the sanding pad—smaller than and nested within the first annular area—based on the wear model, a second sequence of contact characteristics representing contact between the second annular area and the workpiece, and a second effective radius of the second annular area less than the first effective radius.

12.4.1 Linear Offset

In this implementation, while navigating the sanding head over a convex section of the workpiece during the processing cycle, the system can increase a lateral offset between the effective axis of the sanding head and the subsequence of normal vectors—and thus move the first, outer abrasive area of the sanding pad into greater contact with the convex region of the workpiece than the second abrasive area—if the second abrasive degradation of the second abrasive area exceeds the first abrasive degradation of the first abrasive area. Conversely, the system can decrease the lateral offset between the effective axis of the sanding head and the subsequence of normal vectors—and thus move the second, inner abrasive area of the sanding pad into greater contact with the convex region of the workpiece than the first abrasive area—if the first abrasive degradation of the first abrasive area exceeds the second abrasive degradation of the second abrasive area.

12.4.2 Linear Offset: Wear Lookahead

Similarly, while processing a convex section of the workpiece and before transitioning the sanding head onto a concave section of the workpiece, the system can decrease a lateral offset between the effective axis of the sanding head and the subsequence of normal vectors, thereby: moving the second, inner abrasive area of the sanding pad into greater contact with the convex region of the workpiece than the second abrasive area; increasing wear rate across the second abrasive area; and decreasing wear rate across the second abrasive area. The system can then increase this lateral offset between the effective axis of the sanding head and the subsequence of normal vectors while processing the concave section of the workpiece, thereby: engaging the first, outer abrasive area of the sanding pad against the concave region of the workpiece; increasing material removal rate from the concave region of the workpiece.

12.4.3 Angular Offset

Additionally or alternatively, while navigating the sanding head over a convex section of the workpiece during the processing cycle, the system can increase an angular pitch offset between the effective axis of the sanding head and the subsequence of normal vectors— and thus move the first, outer abrasive area of the sanding pad into greater contact with the convex region of the workpiece than the second abrasive area—if the second abrasive degradation of the second abrasive area exceeds the first abrasive degradation of the first abrasive area. Conversely, the system can decrease the angular pitch offset between the effective axis of the sanding head and the subsequence of normal vectors—and thus move the second, inner abrasive area of the sanding pad into greater contact with the convex region of the workpiece than the first abrasive area—if the first abrasive degradation of the first abrasive area exceeds the second abrasive degradation of the second abrasive area.

Similarly, while navigating the sanding head over a concave section of the workpiece (e.g., a reverse-curve section) during the processing cycle, the system can increase the angular pitch offset between the effective axis of the sanding head and the subsequence of normal vectors—and thus move the first, outer abrasive area of the sanding pad into greater contact with the convex region of the workpiece than the second abrasive area—if the second abrasive degradation of the second abrasive area exceeds the first abrasive degradation of the first abrasive area. Conversely, the system can decrease the angular pitch offset between the effective axis of the sanding head and the subsequence of normal vectors—and thus move the second, inner abrasive area of the sanding pad into greater contact with the convex region of the workpiece than the first abrasive area—if the first abrasive degradation of the first abrasive area exceeds the second abrasive degradation of the second abrasive area.

12.4.4 Wear Balancing

The system can implement the foregoing processes to deviate the effective axis of the sanding head from normal vectors of the toolpath to balance abrasiveness degradation (or "wear") across many abrasive areas of the sanding pad throughout the processing cycle, as shown in FIG. 3.

12.4.5 Linear+Angular Offset

The system can also implement the foregoing processes to concurrently angularly and linearly deviate the effective axis of the sanding head from normal vectors of the toolpath. For example, the system can deviate the effective axis of the sanding head—from normal vectors through the workpiece—by angular and linear offsets that yield shortest total deviations from the toolpath and/or least overall motion for the robot.

13. Pad Replacement

Block S170 of the method S100 recites, in response to the first abrasive degradation exceeding a threshold degradation, pausing the processing cycle for replacement of the sanding head. Generally, in Block S170, the system can pause the processing cycle and issue a prompt for manual replacement of the sanding pad or issue a command for automatic replacement of the sanding pad on the sanding head, such as: if the maximum or average abrasiveness degradation of the sanding pad exceeds the sanding pad wear threshold described above; if the minimum or average abrasiveness of the sanding pad falls below a minimum abrasiveness; or if the effective abrasiveness of the sanding pad diminishes to yield a material removal rate less than a threshold material removal rate.

In one implementation shown in FIG. 2, in response to the abrasive degradation of all or a portion of (e.g., an abrasive area, an annular area) the sanding pad exceeding a threshold degradation, the system can: generate a prompt to replace the sanding pad on the sanding head; and serve the prompt to an operator, such as by rendering the prompt on a display adjacent the system or by transmitting the prompt to a mobile device carried by the operator. Then, in response to confirmation of manual replacement of the sanding pad on the sanding head—such as through the display or the mobile device—the system can resume the processing cycle.

Alternatively, in response to the abrasive degradation of all or a portion of (e.g., an abrasive area, an annular area) the sanding pad exceeding a threshold degradation, the system can issue a sanding pad replacement command to an autonomous tool changer adjacent or integrated into the system.

13.1 Wear Estimation Frequency+Display

Furthermore, the system can regularly repeat the foregoing process to estimate an abrasiveness of abrasive area on the workpiece, such as at a refresh rate of once per second or one per minute during the processing cycle.

The system can also render abrasive degradation of the whole sanding pad or discrete abrasive areas on the sanding pad on a display arranged proximal the workpiece during the processing cycle. For example, the system can interface with the display to: render a circular icon representing the workpiece; and render an annual gradient—representing current estimated abrasiveness—over the circular icon to visually indicate current estimated abrasiveness across the sanding pad.

13.2 Time to Sanding Pad Replacement

In one variation, the system calculates a rate of abrasiveness degradation of the sanding pad based on changes in abrasiveness of the whole sanding pad or discrete abrasive areas on the sanding pad over time. The system then extrapolates future abrasiveness degradation of the sanding pad to predict a future time at which: the maximum or average abrasiveness degradation of the sanding pad exceeds the sanding pad wear threshold; the minimum or average abrasiveness of the sanding pad falls below the minimum abrasiveness; or the effective abrasiveness of the sanding pad diminishes to yield a material removal rate less than the threshold material removal rate.

In this variation, the system can then: predict a time duration to this abrasiveness degradation limit; render this time duration on the display; and/or preemptively serve a prompt to replace the sanding pad to an operator prior to the sanding pad reaching this abrasiveness degradation limit in order to minimize processing cycle delays at the system.

The systems and methods described herein can be embodied and/or implemented at least in workpiece as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in workpiece as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   accessing a first toolpath for a first workpiece region of a workpiece;
   accessing a first target force assigned to the workpiece;
   accessing a wear model representing abrasive degradation of a sanding pad arranged on a sanding head; and
   during a processing cycle:
      accessing a sequence of force values output by a force sensor coupled to the sanding head;
      via a set of actuators coupled to the sanding head:
         navigating the sanding head across the first workpiece region according to the first toolpath; and
         based on the sequence of force values, deviating the sanding head from the first toolpath to maintain forces of the sanding head on the first workpiece region proximal the first target force;
      accessing a first sequence of contact characteristics representing contact between a first abrasive area on the sanding pad and the workpiece;
      estimating a first abrasive degradation of the first abrasive area based on the wear model and the first sequence of contact characteristics; and
      in response to the first abrasive degradation exceeding a threshold degradation, pausing the processing cycle for replacement of the sanding head.

2. The method of claim 1, further comprising:
   in response to the first abrasive degradation exceeding a threshold degradation:
      generating a prompt to replace the sanding pad on the sanding head; and
      serving the prompt to an operator; and
   in response to confirmation of manual replacement of the sanding pad on the sanding head, resuming the processing cycle.

3. The method of claim 1:
   wherein estimating the first abrasive degradation comprises updating the first abrasive degradation at a refresh rate during the processing cycle based on the wear model and the first sequence of contact characteristics; and
   further comprising rendering the first abrasive degradation on a display proximal the workpiece during the processing cycle.

4. The method of claim 1, further comprising, during the processing cycle, increasing the first target force proportional to the first abrasive degradation.

5. The method of claim 1:
   further comprising:
      during a scan cycle preceding the processing cycle, navigating an optical sensor arranged on an end effector along the scan path over and offset above the workpiece, the end effector supporting the sanding head during the processing cycle;
      accessing a set of images captured by the optical sensor during the scan cycle; and
      compiling the set of images into a virtual model of the workpiece;
   wherein accessing the first toolpath comprises generating the first toolpath based on a geometry of the workpiece represented in the virtual model; and
   wherein deviating the sanding head from the first toolpath during the processing cycle comprises deviating the sanding head from the first toolpath, normal to contours represented in the virtual model and corresponding to local surfaces of the workpiece in contact with the sanding head, to maintain forces of the sanding head on the first workpiece region proximal the first target force.

6. The method of claim 1:
   further comprising:
      accessing an abrasive specification of the sanding pad; and
      accessing a target material removal depth from the workpiece;
   wherein accessing the first target force comprises:
      calculating the first target force based on the abrasive specification and proportional to the target material removal depth;
   further comprising:
      calculating a first feed rate proportional to the first target force; and
      assigning the first feed rate to the first toolpath; and
   wherein navigating the sanding head across the first workpiece region during the processing cycle comprises navigating the sanding head across the first workpiece region at the first feed rate.

7. The method of claim 6:
   further comprising:
      during a scan cycle preceding the processing cycle, navigating an optical sensor arranged on an end effector along the scan path over and offset above the workpiece, the end effector supporting the sanding head during the processing cycle;
      accessing a set of images captured by the optical sensor during the scan cycle;
      compiling the set of images into a virtual model of the workpiece; and
      calculating a first stepover distance proportional to the first target force and inversely proportional to the first feed rate;
   wherein accessing the first toolpath comprises, based on a geometry of the workpiece represented in the virtual model, generating the first toolpath defining a boustrophedonic pattern characterized by the first stepover distance; and
   further comprising, during the processing cycle, decreasing the first stepover distance proportional to the first abrasive degradation.

8. The method of claim 6, further comprising, during the processing cycle, decreasing the first feed rate proportional to the first abrasive degradation.

9. The method of claim 1:
   further comprising:
      during a scan cycle preceding the processing cycle, navigating an optical sensor arranged on an end effector along the scan path over and offset above the workpiece, the end effector supporting the sanding head during the processing cycle;
      accessing a set of images captured by the optical sensor during the scan cycle; and
      compiling the set of images into a virtual model of the workpiece;
   wherein accessing the first toolpath comprises, based on a geometry of the workpiece represented in the virtual model, generating the first toolpath comprising a sequence of keypoints, each keypoint in the sequence of keypoints defining a three-dimensional position on the virtual model and a vector normal to the three-dimensional position on the virtual model;

wherein navigating the sanding head across the first workpiece region during the processing cycle comprises:
  interpolating a subsequence of vectors between a first vector of a first keypoint and a second vector of a second keypoint, the sequence of keypoints comprising the first keypoint and the second keypoint;
  navigating the sanding head to the first keypoint; and
  while navigating the sanding head from the first keypoint to the second keypoint:
    aligning an effective axis of the sanding head coaxial with the subsequence of vectors; and
wherein deviating the sanding head from the first toolpath comprises:
  while navigating the sanding from the first keypoint to the second keypoint:
    translating the sanding head, parallel to the subsequence of vectors, to maintain forces of the sanding head on the first workpiece region proximal the first target force.

10. The method of claim 9:
wherein estimating the first abrasive degradation of the first abrasive area comprises estimating the first abrasive degradation of the first abrasive area, comprising a first annular region on the sanding pad, based on the wear model, the first sequence of contact characteristics, and a first effective radius of the first abrasive area;
further comprising estimating a second abrasive degradation of a second abrasive area based on the wear model, the first sequence of contact characteristics, and a second effective radius of the second abrasive area less than the first effective radius; and
further comprising, during the processing cycle:
  navigating the sanding head over a first convex section of the workpiece;
  in response to the second abrasive degradation exceeding the first abrasive degradation:
    increasing a lateral offset between the effective axis of the sanding head and the subsequence of vectors; and
  in response to the first abrasive degradation exceeding the second abrasive degradation:
    decreasing the lateral offset between the effective axis of the sanding head and the subsequence of vectors.

11. The method of claim 9:
wherein estimating the first abrasive degradation of the first abrasive area comprises estimating the first abrasive degradation of the first abrasive area, comprising a first annular region on the sanding pad, based on the wear model, the first sequence of contact characteristics, and a first effective radius of the first abrasive area;
further comprising estimating a second abrasive degradation of the second abrasive area based on the wear model, the first sequence of contact characteristics, and a second effective radius of the second abrasive area; and
further comprising, during the processing cycle:
  navigating the sanding head over a first convex section of the workpiece;
  in response to the second abrasive degradation exceeding the first abrasive degradation:
    increasing an angular pitch offset between the effective axis of the sanding head and the subsequence of vectors; and
  in response to the first abrasive degradation exceeding the second abrasive degradation:
    decreasing the angular pitch offset between the effective axis of the sanding head and the subsequence of vectors.

12. The method of claim 11:
wherein estimating the first abrasive degradation of the first abrasive area comprises estimating the first abrasive degradation of the first abrasive area, comprising a first annular region on the sanding pad, based on the wear model, the first sequence of contact characteristics, and a first effective radius of the first abrasive area;
further comprising estimating a second abrasive degradation of the second abrasive area based on the wear model, the first sequence of contact characteristics, and a second effective radius of the second abrasive area; and
further comprising, during the processing cycle:
  navigating the sanding head over a second concave section of the workpiece;
  in response to the second abrasive degradation exceeding the first abrasive degradation:
    increasing the angular pitch offset between the effective axis of the sanding head and the subsequence of vectors; and
  in response to the first abrasive degradation exceeding the second abrasive degradation:
    decreasing the angular pitch offset between the effective axis of the sanding head and the subsequence of vectors.

13. The method of claim 1:
wherein accessing the first sequence of contact characteristics comprises:
  detecting contact between the workpiece and the first abrasive area during a first sequence of rotations of the sanding pad on the sanding head based on:
    a position of the first abrasive area on the sanding pad;
    a first geometry of a first segment of the workpiece, adjacent the sanding head during the first sequence of rotations, represented in the virtual model; and
    a first orientation of the sanding head relative to the first segment of the workpiece during the first sequence of rotations; and
  in response to detecting contact between the workpiece and the first abrasive area during the first sequence of rotations:
    generating a first contact characteristic, in the first sequence of contact characteristics, comprising a first count of the first sequence of rotations corresponding to contact between the workpiece and the first abrasive area; and
wherein estimating the first abrasive degradation of the first abrasive area comprises, based on the wear model, estimating the first abrasive degradation of the first abrasive area during the first sequence of rotations:
  proportional to a first sequence of force values output by the force sensor during the first sequence of rotations; and
  proportional to the first count of the first sequence of rotations represented in the first contact characteristic.

14. The method of claim 13:
wherein detecting contact between the workpiece and the first abrasive area during the first sequence of rotations comprises:
  detecting contact between the workpiece and the first abrasive area, comprising a first annular region on the sanding pad, during the first sequence of rotations further based on a first effective radius of the first annular region on the sanding pad; and wherein estimating the first abrasive degradation of the first abrasive area comprises:
  estimating a first force component, of the first sequence of force values, applied by the first abrasive area to the workpiece during the first sequence of rotations based on a ratio of the first abrasive area to a total area of the sanding pad; and
  estimating the first abrasive degradation of the first abrasive area during the first sequence of rotations based on a combination of the first force component and the first count of the first sequence of rotations.

15. The method of claim 13:
wherein accessing the first sequence of contact characteristics comprises:
  detecting absence of contact between the workpiece and the first abrasive area during a second sequence of rotations of the sanding pad on the sanding head based on:
    the position of the first abrasive area on the sanding pad;
    a second geometry of a second segment of the workpiece, adjacent the sanding head during the second sequence of rotations, represented in the virtual model; and
    a second orientation of the sanding head relative to the second segment of the workpiece during the second sequence of rotations; and
  in response to detecting absence of contact between the workpiece and the first abrasive area during the second sequence of rotations:
    generating a second contact characteristic, in the first sequence of contact characteristics, comprising a null count of rotations corresponding to contact between the workpiece and the first abrasive area; and
wherein estimating the first abrasive degradation of the first abrasive area comprises, based on the wear model, estimating null degradation of the first abrasive area during the second sequence of rotations based on the second contact characteristic.

16. The method of claim 1:
wherein accessing the first sequence of contact characteristics comprises:
  detecting contact between the workpiece and the first abrasive area during a first time period based on:
    a position of the first abrasive area on the sanding pad;
    a first geometry of a first segment of the workpiece, adjacent the sanding head during the first time period, represented in the virtual model; and
    a first orientation of the sanding head relative to the first segment of the workpiece during the first time period; and
  in response to detecting contact between the workpiece and the first abrasive area during the first time period:
    generating a first contact characteristic, in the first sequence of contact characteristics, representing a first duration of the first time period; and
wherein estimating the first abrasive degradation of the first abrasive area comprises, based on the wear model, estimating the first abrasive degradation of the first abrasive area during the first time period:
  proportional to a first sequence of force values output by the force sensor during the first time period; and
  proportional to the first duration of the first time period represented in the first contact characteristic.

17. The method of claim 16:
wherein detecting contact between the workpiece and the first abrasive area during the first time period comprises:
  detecting contact between the workpiece and the first abrasive area, comprising a first annular region on the sanding pad, during the first time period further based on a first effective radius of the first annular region on the sanding pad; and
wherein estimating the first abrasive degradation of the first abrasive area comprises:
  estimating a first force component, of the first sequence of force values, applied by the first abrasive area to the workpiece during the first time period based on a ratio of the first abrasive area to a total area of the sanding pad; and
  estimating the first abrasive degradation of the first abrasive area during the first time period based on an integral of the first force component over the first duration.

18. A method comprising:
accessing a first toolpath for a first workpiece region of a workpiece;
accessing a first set of processing parameters assigned to the first workpiece region, the first set of processing parameters comprising a first target force and a first feed rate;
accessing a wear model representing abrasive degradation of a sanding pad arranged on a sanding head; and
during a processing cycle:
  accessing a sequence of force values output by a force sensor coupled to the sanding head;
  via a set of actuators coupled to the sanding head:
    navigating the sanding head across the first workpiece region according to the first toolpath; and
    based on the sequence of force values, deviating the sanding head from the first toolpath to maintain forces of the sanding head on the first workpiece region proximal the first target force;
  accessing a first sequence of contact characteristics representing contact between a first abrasive area on the sanding pad and the workpiece;
  estimating a first abrasive degradation of the first abrasive area based on the wear model and the first sequence of contact characteristics; and
  modifying the first set of processing parameters based on the first abrasive degradation.

19. The method of claim 18:
wherein modifying the first set of processing parameters comprises, during the processing cycle, increasing the first target force proportional to the first abrasive degradation; and
further comprising:
  accessing a force limit for the workpiece; and
  in response to the first target force approaching the force limit, pausing the processing cycle for replacement of the sanding pad.

20. The method of claim 18:
wherein accessing the first set of processing parameters comprises accessing the first set of processing parameters further comprising a first stepover distance between legs of the first toolpath; and
wherein modifying the first set of processing parameters comprises, during the processing cycle:

increasing the first target force proportional to the first abrasive degradation;
decreasing the first feed rate proportional to the first abrasive degradation; and
decreasing the first stepover distance proportional to the first abrasive degradation.

\* \* \* \* \*